United States Patent [19]

Turner et al.

[11] 4,139,355
[45] Feb. 13, 1979

[54] FOUR WAVE VALVE FOR REVERSIBLE CYCLE REFRIGERATION SYSTEM

[75] Inventors: Jesse H. Turner; Jack D. Raymer, both of Auburn, Ind.

[73] Assignee: Essex Group, Inc., Fort Wayne, Ind.

[21] Appl. No.: 791,744

[22] Filed: Apr. 28, 1977

[51] Int. Cl.² .............................................. F25B 13/00
[52] U.S. Cl. .................................. 62/324; 137/625.43; 251/134
[58] Field of Search ................................ 62/324, 160; 137/625.43; 251/134; 236/78 C, 1 B

[56] References Cited

U.S. PATENT DOCUMENTS

| 2,855,000 | 10/1958 | Van Allen et al. | 137/625.43 |
| 3,165,681 | 1/1965 | Pinckaers | 236/78 C X |
| 3,914,676 | 10/1975 | Madonian et al. | 251/134 X |

Primary Examiner—William E. Wayner
Attorney, Agent, or Firm—Lawrence E. Freiburger; Robert D. Sommer

[57] ABSTRACT

A four way valve assembly for a reversible cycle refrigeration system in which a rotary valve accomplishes the switching between heating and cooling modes. The rotary valve is mounted in a cavity in a housing and is designed to be rotated by a unidirectional electric motor. The rotary valve comprises a plate having a pair of recesses in it, which each acts to connect a pair of ports in a base plate together. A high pressure bypass port maintains the pressure in the cavity at a relatively high level such that the high pressure tends to increase the abutting contact between the valve plate and the base plate. A cam and switch arrangement provides the necessary control to stop and start the electric motor.

3 Claims, 6 Drawing Figures

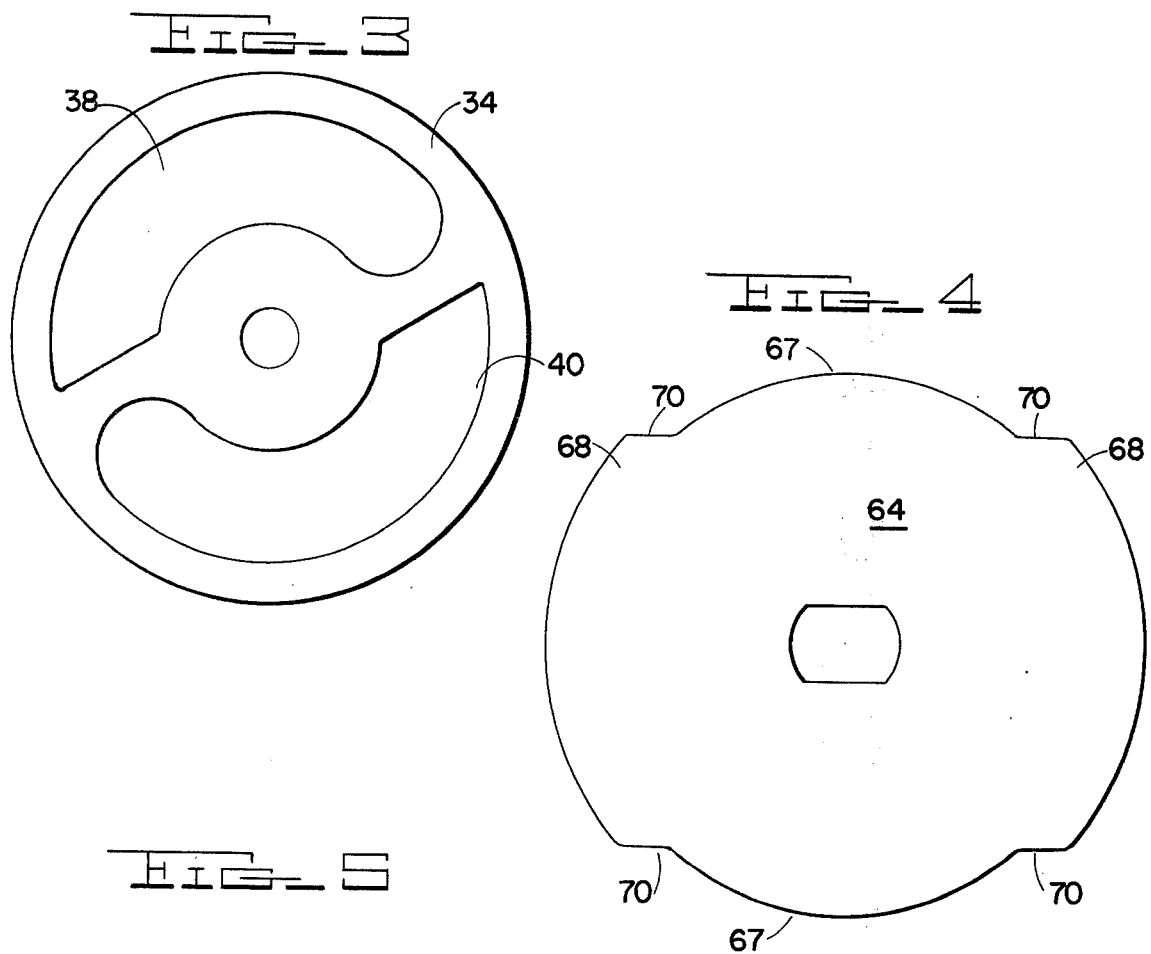
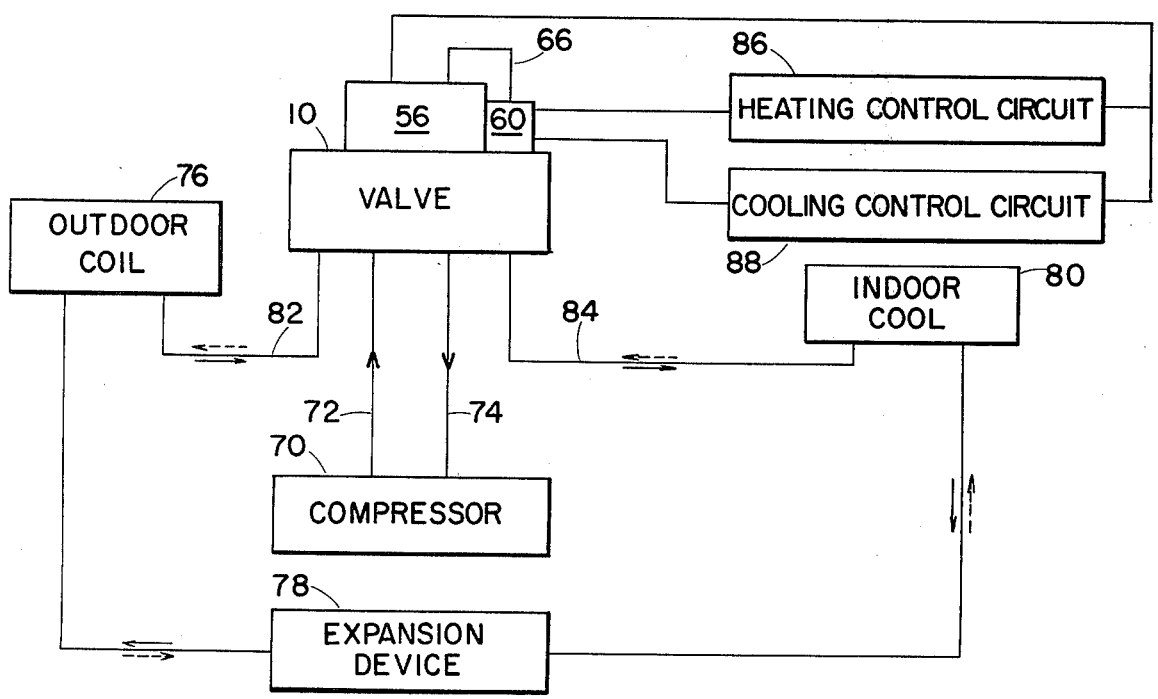

FOUR WAVE VALVE FOR REVERSIBLE CYCLE REFRIGERATION SYSTEM

BACKGROUND OF THE INVENTION

Heat pump type cooling systems have long been known to be reversible to provide both heating and cooling modes. This type of system has an indoor heat exchanger and an outdoor heat exchanger. In the heating mode, the outdoor heat exchanger removes heat from the outdoor air and the indoor heat exchanger acts to transfer this heat to the air in the conditioned space. In the cooling mode, the system is reversed by a reversing valve so that the indoor heat exchanger removes heat from the air in the conditioned space and the outdoor heat exchanger acts to transfer this heat to the outdoor air.

One type of reversing valve presently in use in reversible heat pump type cooling systems consists of an electrically energized solenoid valve which normally opens and/or closes a pilot port to cause a pressure differential across a piston type valve which in turn, causes a slide valve to shift position and reverse the coolant flow in the system. This type of reversing valve reverses refrigerant flow almost instantaneously, and causes substantial reversal shock on the entire system.

The present day reversing valve designs suffer from a number of drawbacks which have been tolerated but which have universally plagued manufacturers of reversible heat pump systems for years. First, the substantial reversal shock caused by the almost instantaneous reversal of refrigerant has caused leakage problems and has necessitated the use of brazed tubing connections. Second, with the present valve designs, foreign material in the refrigerant has caused clogging problems and increased wear on the valve components. This problem can be solved by placing a filter in the system but the filter provides an additional pressure drop which cannot be tolerated in some systems. A third problem area with present designs lies in the use of plastic components in the valve and the present day methods employed in factory and field installation of these valves. In present installation methods, the valve body is connected to system tubing by brazing. Because of the temperatures encountered in the brazing process it is necessary to provide some means to dissipate the heat in order to prevent damage of the plastic valve components. In the prior art reversing valves, the valve is held in the operated position by an electrically energized operator. Thus, prior art reversing valves tend to consume a substantial amount of power. Another problem noted with present reversing valve designs is the requirement of system differential pressures in order to reverse the valve. Thus, with prior art designs, if this pressure differential is not present, the valve cannot operate.

SUMMARY OF THE INVENTION

It is thus an object of the present invention to eliminate many of the problems associated with prior art reversing valves, such as the substantial reversal shock to the system; the need to provide a filter; the use of plastic components in the valve assembly; and the excessive consumption of electrical power by the reversing valve.

These objects as well as others which will become apparent as the description of the invention proceeds are accomplished by the rotary reversing valve of the invention. In summary, the reversing valve of the invention provides a base plate having four ports therein which are each adapted to be connected to the system tubing with or without brazing. The base plate forms a planar wall which defines a cavity inside the valve housing. Situated within the cavity is a rotatable valve plate having a planar surface in face-to-face contact with the planar wall. A first recess in the planar surface acts to connect the high pressure port to the indoor coil port, and a second recess acts to connect the suction port to the outdoor coil port when the valve plate is rotated to a first position. When the valve plate is rotated to a second position, the first recess connects the high pressure port to the outdoor coil port and the second recess connects the suction port to the indoor coil port. The valve of the invention drastically reduces reversal shock to the system by providing a gradual change-over between the first and second valve positions.

BRIEF DESCRIPTION OF THE DRAWINGS

During the course of the detailed description of the preferred embodiment of the invention reference will be made to the drawings in which:

FIG. 3 is a view taken along line 3—3 of FIG. 1;

FIG. 4 is a view taken along line 4—4 of FIG. 1;

FIG. 5 is a schematic diagram showing the valve of the invention in a reversible cycle heat pump system.

DETAILED DESCRIPTION OF THE INVENTION

Figure 1:
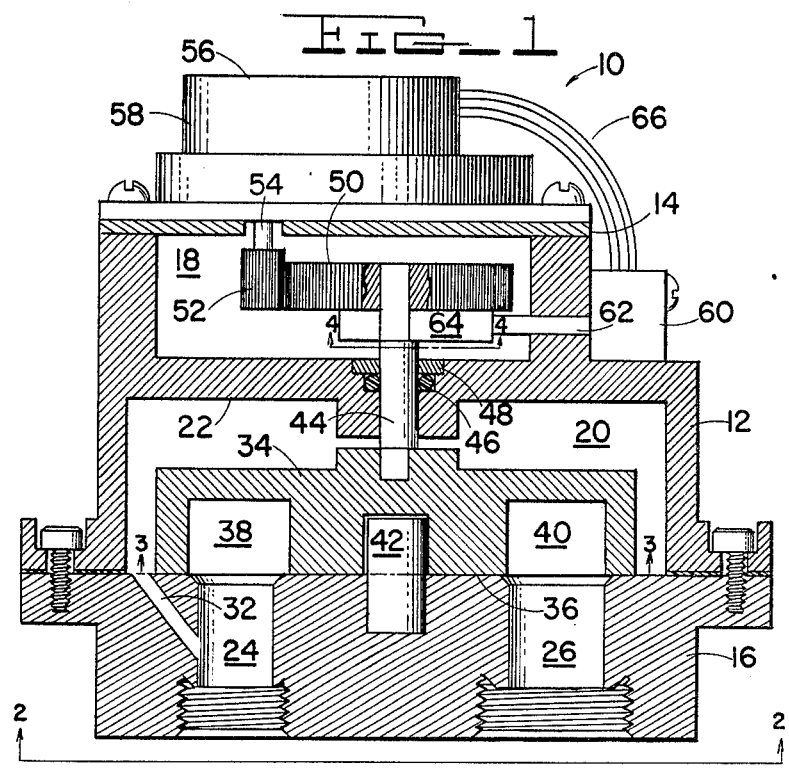
FIG. 1 is a cross-sectional view of a rotary four way valve assembly in accordance with the present invention.
Figure 2:
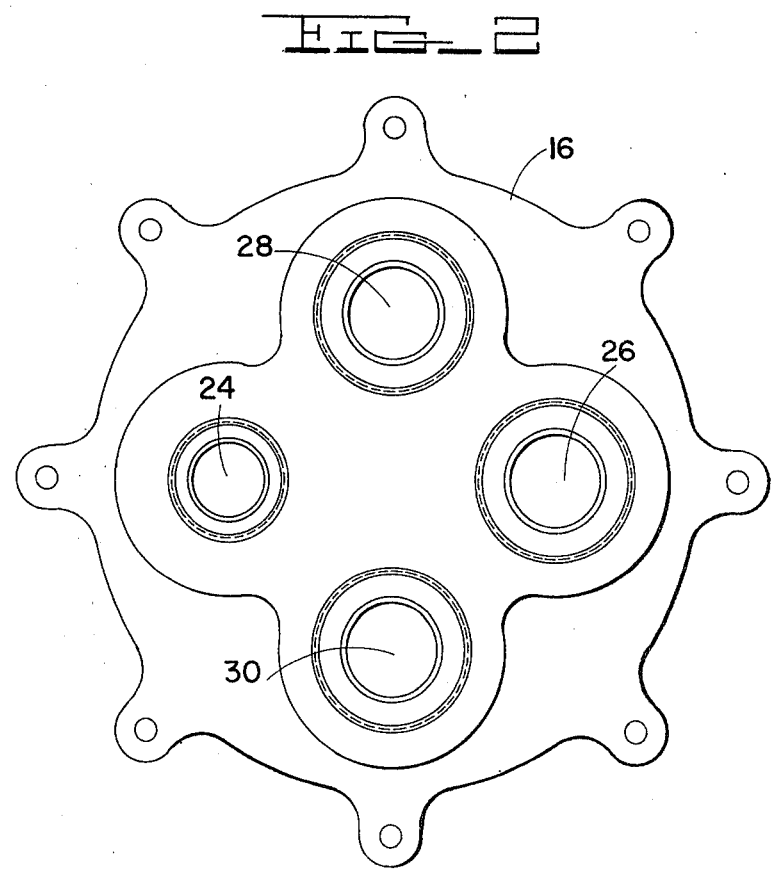
FIG. 2 is a view taken along line 2—2 of FIG. 1.

Referring now to the drawing FIGURES and particularly FIG. 1, the valve assembly of the invention generally indicated by reference numeral 10 is mounted in a housing including a central portion 12, an upper plate 14, and a base plate 16. The housing is separated into an upper cavity 18 and a lower cavity 20 by an intermediate wall 22. Upper plate 14 thus serves to seal upper cavity 18 from the atmosphere, and lower base plate 16 performs the same function for lower cavity 20. The components of the housing assembly are secured together by suitable means such as cap screws. Additionally, a resilient seal or gasket may be placed between adjacent components where necessary.

The base plate 16 is shown in the drawings as having four ports (24, 26, 28 and 30) therein which are equidistantly spaced from the center of the valve housing at 90° intervals and which lead into the lower housing cavity 20. Each of these ports is counterbored and threaded to receive a threaded tubing connector. In the preferred form of the invention, the base plate 16 may be constructed of brass, although other materials may be used as well. As shown in the drawings, one of the ports 24 is of smaller diameter than the others. This port 24 is hereinafter designated as the high pressure (HP) port since it is specifically designed to be connected to the high pressure line from the compressor. A smaller high pressure bypass port 32 connects high pressure port 24 to cavity 20. Port 26 will hereinafter be designated as the suction port since it is specifically adapted to be connected to the compressor suction line when installed in the system. The other two ports 28 and 30, respectively, will hereinafter be designated as the outdoor coil port and the indoor coil port since they are specifically adapted to be connected to these heat exchange coils.

Situated within lower cavity 20 is a flat circular valve plate 34 having a lower planar surface 36 in face-to-face contact with the planar wall defined by the surface of base plate 16. The lower surface of valve plate 34 has a pair of generally semicircular shaped recesses 38 and 40 formed in it, each of which serves to connect two adjacent ports together when the valve plate is located in certain rotative positions as will hereinafter be described. A guide pin 42 is situated within axially aligned bores in the valve plate member 34 and base plate 16 to provide an axis about which valve plate 34 is rotated.

The valve plate 34 is rotated by a shaft 44 extending through a central aperture in wall 22 from cavity 18. Shaft 44 is fixed to valve plate 34 by any suitable means and a shaft seal 46 and seal retainer 48 prevent any fluid communication between cavities 18 and 20. The shaft 44 is rotated by a gear reduction assembly located in cavity 18. The gear reduction assembly consists of an output gear 50 axially situated on the upper end of shaft 44 which meshes with an input pinion gear 52 situated on the end of a motor shaft 54 driven by a unidirectional electric motor 56. A suitable housing 58 is secured to intermediate housing section 12 by cap screws or the like to provide a mounting for the electric motor 56. It will be appreciated that other mountings for the motor 56 may be employed as well.

Control of electrical motor 56 is effected by an electrical switch 60 suitably mounted on the intermediate housing section with the switch actuator 62 extending through the housing and into cavity 18 at right angles to shaft 44. A cam member 64 axially mounted on shaft 44 between gear 50 and wall 22 provides the movement for switch actuator 62. The switch 60 is preferably a single-pole double-throw snap acting switch having a normally open contact pair and a normally closed contact pair which are electrically connected so that they each control power supplied to electric motor through lead-wire 66. Cam member 64 is shown in more detail in FIG. 4, where it is shown to be generally symmetrical and has a pair of cam lobes 68 defining transition shoulders 70 between the lobe 68 and normal surface 67 of the cam.

In FIG. 5, the valve is schematically depicted in a reversible cycle refrigeration system including a compressor 70 which serves to pump refrigerant through the system. The compressor 70 is connected to valve 10 by a high pressure line 72 which leads into high pressure port 24 and a suction line 74 which leads from suction port 26. The system in which valve 10 is designed to be used also includes an outdoor heat exchange coil 76, an expansion device 78 and an indoor heat exchange coil 80 connected in series with one another. These three components are well known and will not be described in detail. Outdoor coil 76 is connected to outdoor coil port 28 of valve 10 by a length of tubing 82 and indoor coil 80 is connected to indoor coil port 30 by a length of tubing 84.

As shown in FIG. 5, the four way valve of the invention is actuated by unidirectional electric motor 56 which, in turn, is actuated through switch 60 by a heating control circuit 86 or a cooling control circuit 88.

Figure 6:
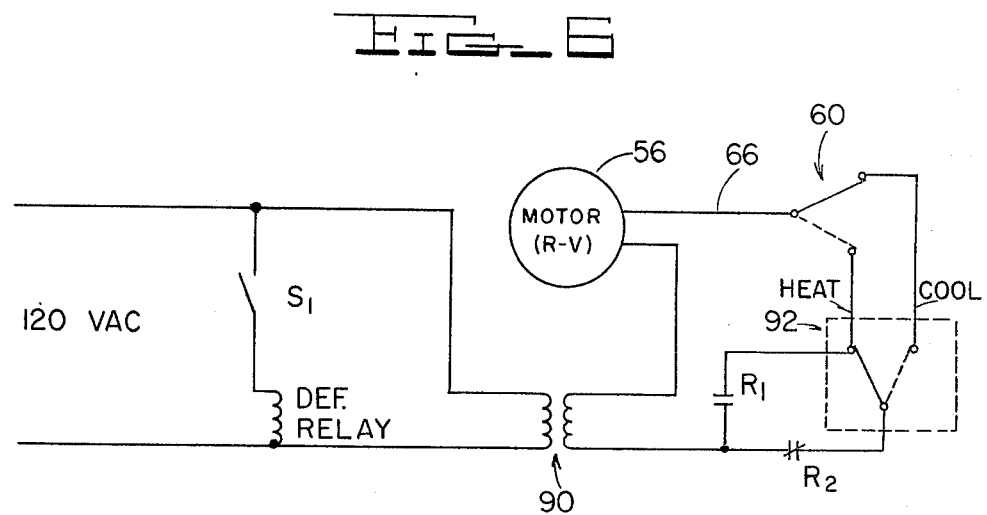
FIG. 6 is a schematic of one possible electrical control system for controlling the valve of the invention.

Referring now to FIG. 6, the reversing valve is shown connected in a control circuit which includes the conventional components such as a 24 volt transformer 90 and the control switch portion 92 of a conventional heat-cool room thermostat. Connected across the 120 volt power source is a normally open switch S, and the coil of a defrost relay having normally open contacts R1 and normally closed contacts R2 located in the 24 volt circuit as shown in the drawings. Operation of the circuit of FIG. 6 which is depicted in the heating mode is as follows. When it is desired that the system operate in the cooling mode the control switch 92 is moved to the cool position. Inasmuch as the switch 60 is in the position indicated in the drawings the motor 56 will be energized through switch 60, the cool portion of switch 92, and normally closed switch contact R2. The motor 56 will move the reversing valve to the cooling mode position at which point switch 60 will transfer to the position indicated in dotted lines to deenergize the reversing valve motor 56. The thermostatic room temperature contacts (not shown) will then control the compressor in a conventional manner. While in the cooling mode if the outdoor coil 76 should ice up, switch S1 will close to energize the defrost relay and cause contacts R1 and R2 to transfer. The reversing valve motor will be energized and will move to its heating position and will then be deenergized when switch contacts 60 transfer. The system will then be operated in the heating mode to cause defrosting of the outdoor coil 76 until S1 opens to cause transfer of contacts R1 and R2 and move the reversing valve motor 56 to the cooling position. When it is again desired to place the system in the heating mode, the control switch 92 is moved to the heat position to energize motor 56 and move the reversing valve to the heating position at which point switch 60 will transfer to deenergize motor 56.

It is believed the operation of the valve assembly of the invention will be clear to those skilled in the art, but for sake of clarity its operation will be briefly described. It will be assumed that the system is operating in the heating mode. Under such conditions, valve plate 34 will be in such a position that high pressure port is connected to indoor coil port 30 and suction port 26 is connected to outdoor coil port 28. Thus, refrigerant will flow in the direction indicated in the drawing by solid arrows. The valve will remain in this condition because the electrical contact in switch 60 connected to heating control circuit 86 is open, and although the electrical contact in switch 60 connected to cooling control circuit 88 is closed, the motor remains deenergized because the cooling control circuit is not energized. When it is desired that the system be operated in a cooling mode, the cooling control circuit 88 is energized and motor 56 will be energized through the closed contacts associated with the cooling mode. Rotation of the motor will cause valve plate 34 and cam 64 to rotate. The recesses 38 and 40 are spaced apart from one another but their ends are located in close proximity to one another. At an intermediate point in the reversing cycle, the ends of the two recesses will thus be located above one of the ports, the opposite ends of the two recesses will be located above the opposite port, and the center of the recesses will be located above the remaining two ports. Thus, at a certain point in the operating cycle, the four ports 24, 26, 28 and 30 are gradually connected together so as to eliminate the reversal shock present with prior art valve. Continued rotation of the motor 56 will move cam 64 so that the contact in switch 60 associated with the heating mode will close. Eventually, continued rotation of the motor will bring valve plate 34 into position such that high pressure port 24 will be connected to outdoor coil port 28 and suction port 26 will be connected to indoor coil port 30. At this point in the cycle, cam 64 will cause the contact in switch 60 associated with the cooling mode to open, thus deenergizing the motor and arresting rotation of the entire assembly. Since, however, the switch contact associated with the heating mode is closed, the assembly will be conditioned for actuation into the heating mode whenever the heating control circuit is energized. In the cooling mode, therefore, refrigerant will be cycled in the system in the direction indicated by the dotted arrows. It should be noted that a wide variety of cycle times can be achieved simply by providing a different speed motor. Cycle times between 10 and 30 seconds can be easily obtained.

Because the valve of the invention substantially eliminates reversal shock, it can be connected into the system using threaded tubing connectors. However, inasmuch as the valve is constructed almost entirely of non-plastic components, it is still possible to use brazed connections in connecting the valve into the system. Inasmuch as plastic seals are not utilized at the valve interface the valve's efficiency relies heavily on metal to metal contact between the valve plate 34 and base plate 16. This means that tolerances between these two components must be held within rather strict limits. In order to relax the necessity for such high tolerances, high pressure bypass port 32 is provided leading into cavity 20. Thus, the high pressure in cavity 20 creates a force on valve plate 34 in a direction toward base plate 16 which opposes the force on valve plate 34 created by the pressure in ports 24, 26, 28 and 30.

The valve design discussed above is used for exemplary purposes only. It is intended, therefore, that the scope of the invention be defined in the claims.

What is claimed is:

1. In a reversible refrigerating system having a compressor, a first heat exchanger having an inlet and an outlet, a second heat exchanger having an inlet and an outlet, a four-way valve, high pressure and suction lines connecting said compressor and four-way valve, means interconnecting said heat exchangers in series relationship with one another, and means connecting the free ends of said heat exchangers to said four-way valve, an improved four-way valve, which comprises:
   a housing;
   a cavity in said housing defined by a plurality of walls with the inner surface of an outer wall being substantially planar;
   a plurality of ports through said planar wall, a first one of said ports being adapted to be connected to said high pressure line, a second one of said ports being adapted to be connected to said suction line, a third one of said ports being adapted to be connected to the free end of said first heat exchanger, and a fourth one of said ports being adapted to be connected to the free end of said second heat exchanger;
   a valve plate rotatably mounted in said cavity, said valve plate including a first substantially planar surface in abutting contact with said planar wall;
   a high pressure by-pass port connecting said high pressure line and said cavity;
   a pair of equally-sized recesses in said planar surface;
   said recesses and said ports being arranged so that a first one of said recesses connects said first and third ports to one another and a second one of said recesses connects said second and fourth ports to one another when said valve plate is rotated to a first position, and said first one of said recesses connects said first and fourth ports to one another and said second one of said recesses connects said second and third ports to one another when said valve plate is rotated to a second position;
   said recesses and ports further being arranged so that said first, second, third and fourth ports are all connected together at a position intermediate said first and second positions; and
   means for rotating said valve plate comprising an electric motor and gear reduction assembly situated between said electric motor and said valve plate.

2. The improved four way valve as claimed in claim 1, further comprising:
   means for arresting movement of said rotating means at said first and second positions.

3. The four way valve as claimed in claim 1, further comprising:
   a snap acting electrical switch including open and closed contacts;
   a first control circuit connected in series with one of said open and closed contacts and said electric motor;
   a second control circuit connected in series with the other of said open and closed contacts and said electric motor; and
   a cam member rotated by said electric motor and arranged to operate said electric switch.

* * * * *